United States Patent [19]
Vook et al.

[11] Patent Number: 5,560,021
[45] Date of Patent: Sep. 24, 1996

[54] POWER MANAGEMENT AND PACKET DELIVERY METHOD FOR USE IN A WIRELESS LOCAL AREA NETWORK (LAN)

[76] Inventors: Frederick W. Vook, 130 Crestwood Ct. #7, Schaumburg, Ill. 60195; Mark Demange, 132 Wilmslow Ln., Schaumburg; Hungkun Chang, 1501 Crowfoot Cir. N., Hoffman Estates, both of Ill. 60194

[21] Appl. No.: 223,497

[22] Filed: Apr. 4, 1994

[51] Int. Cl.⁶ .................................................. G06F 13/00
[52] U.S. Cl. .............. 395/750; 395/200.01; 395/200.05; 395/00.12; 395/200.14; 395/200.17; 395/ 200.19
[58] Field of Search ...................... 395/750, 842, 395/200.01, 200.05, 200.12, 200.14, 200.17, 200.19; 364/707

[56] References Cited

U.S. PATENT DOCUMENTS 5,230,074  7/1993  Canova Jr. et al. .................. 395/750

OTHER PUBLICATIONS

IEEE 802.11 Wireless Access Method and Physical Specification, Nov. 1993, Distributed Foundation Wireless MAC, Belanger, Ennis and Diepstaten, pp. 1–72.

IEEE 802.11 Wireless Access Method and Physical Specification, Jul. 1993, Distributed Access WMAC Synchronization and Power Management Mechanisms, G. Ennis and W. Diepstraten, pp. 1–27.

*Primary Examiner*—Jack B. Harvey
*Assistant Examiner*—John Travis
*Attorney, Agent, or Firm*—ValJean Hillman

[57] ABSTRACT

A power management and packet delivery method for use in a wireless local area network (LAN) having a plurality of mobile battery powered user devices, the user devices in communication with each other, the power management and packet delivery technique for determining when a user device may transition from an active mode of operation to a sleep mode of operation and further for determining when a user device in the sleep mode of operation should transition to the active mode of operation. The method further operative to inform an intended destination device that data is forthcoming, thereby prohibiting that device from entering the sleep mode until after the data has been delivered.

15 Claims, 5 Drawing Sheets

100

5,560,021

POWER MANAGEMENT AND PACKET DELIVERY METHOD FOR USE IN A WIRELESS LOCAL AREA NETWORK (LAN)

FIELD OF THE INVENTION

This invention is directed to a data communication system and in particular to a method for assuring the delivery of packets in a wireless local area network (LAN) that employs a power management strategy.

BACKGROUND OF THE INVENTION

In a wireless communication system wherein a plurality of mobile battery powered devices employ wireless techniques in order to communicate with each other, extending the battery life i.e., extending the time period between battery recharges is of key importance to continued communications. As will be appreciated, various subsystems of a battery powered device may place heavier demands upon battery resources than others. For example, when the battery powered device employs a wireless transceiver to transmit and receive data, said transceiver typically consumes significant quantities of battery power, and hence, adversely impacts overall battery life. In order to increase the overall battery life of such devices, it would be extremely advantageous to provide a power management methodology for use in association with the wireless communication system that is capable of minimizing the power consumed by such battery powered devices.

Unfortunately, problems with data delivery begin to surface as power management schemes permit devices to alternate between various modes of operation, such as, for example, either an "active" or a "sleep" mode of operation. As will be appreciated, when a communicating device enters the sleep mode of operation, only the basic device functions such as system clock, timers, interrupts, etc. are operational. During the sleep mode, power to the rest of the device hardware is turned off. In particular, the wireless transceiver portion of an asleep device receives no power, thus, the device can neither transmit nor receive information, and therefore cannot perform any communications activities. Under the above scenario, the channel access performance of an asleep device is severely impaired due to its inability to communicate.

It would be extremely advantageous therefore to provide a power management and packet delivery method for use in a wireless LAN that assures packet delivery and improves the channel access performance of asleep devices.

SUMMARY OF THE INVENTION

Figure 1:
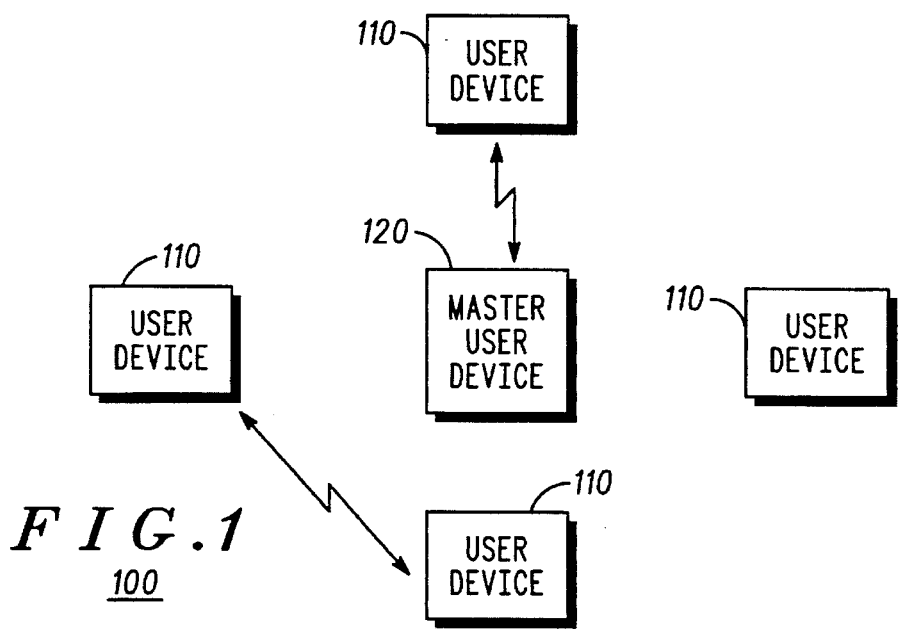
FIG. 1 illustrates in block diagram form a wireless communication system anticipated by the present invention.

Briefly described, the present invention is a power management and packet delivery method for use in a wireless local area network (LAN). The method employs processing steps including, but not limited to, establishing a plurality of recurring time intervals, each time interval having a portion during which all user devices are in the active mode of operation; transmitting an indicator signal from a user device having data to transmit, during at least one of the plurality of recurring time intervals, and prior to transmission of said data; receiving said transmitted indicator signal at an intended destination device, said device thereby being prohibited from entering a sleep mode of operation in response to receipt of the indicator signal.

DETAILED DESCRIPTION OF A PREFERRED EMBODIMENT

Before describing an embodiment of the present invention, it is believed that an overview will aid in the reader's understanding. The purpose of the typical power management scheme is to minimize the power consumption at a wireless battery powered communications device such as a notebook computer, lap-top computer, personal digital assistant (PDA) and the like which employ wireless (e.g., radio frequency and infrared) transceivers in order to transmit and receive information. To achieve this goal, the wireless device is designed to operate in two power consumption states: the "sleep" mode and the "active" mode of operation.

During the sleep mode, only the basic device functions such as system clock, timers, interrupts, etc. are operational, as power to the rest of the device hardware is turned off. In particular, the wireless transceiver receives no power, thus, the device can neither transmit nor receive information, and, therefore cannot perform any communications activities. When the device successfully transitions to the active mode of operation, however, full communicating capabilities are restored. The power management strategy of the present invention defines how and when a device may and should alternate between the sleep and active modes of operation and additionally attempts to balance the trade-offs between reduced power consumption and channel access performance.

As will be appreciated, the longer a device remains in the sleep mode of operation, the greater the anticipated power savings. Unfortunately, the longer a device is asleep, the poorer its channel access performance (e.g., throughput) will be. An effective power management strategy must therefore strive to provide adequate balances between the channel access performance and power savings of portable communicating devices. Such a strategy must be compatible with any synchronization requirements of the communication system that it supports. For example, a power management strategy must not put a device to sleep for an amount of time that will cause the device's time reference to drift by more than a maximum allowable error value. It must also provide some method of assuring packet delivery to asleep devices. Finally, an effective power management strategy should have minimal adverse impact on system hand-off or link transfer operations. These and other advantages are achieved via the power management and packet delivery method of the present invention.

FIG. 1 illustrates in block diagram form a wireless communication system anticipated by the present invention comprising a wireless local area network (LAN) 100. For the purpose of this discussion, wireless LAN 100 consists of a plurality of user devices 110 such as portable computers, lap-top computers, personal digital assistants (PDAs) and the like. These devices utilize wireless communications techniques to communicate with each other. One of the user devices is designated as the MASTER user device (MUD) 120. MUD 120 is responsible for synchronizing the other devices 110. Except for this responsibility, MUD 120 is identical to the other devices 110.

Figure 2:
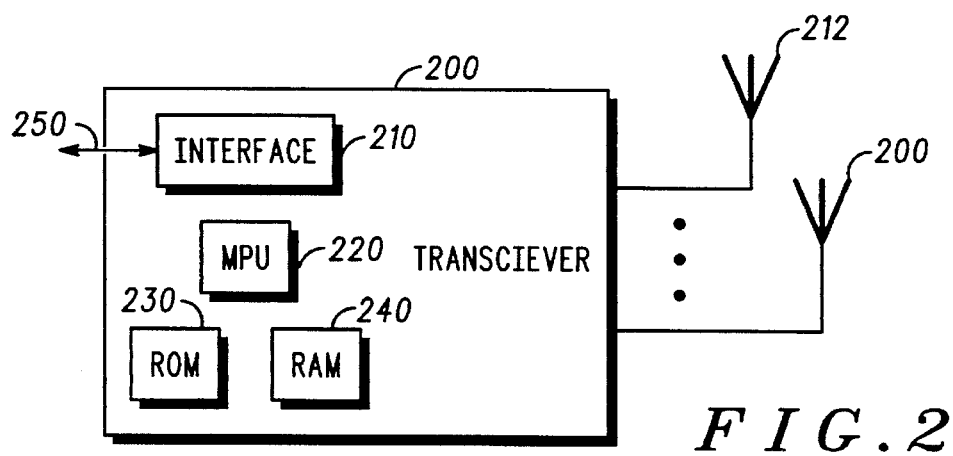
FIG. 2 illustrates a block diagram of a structure common to the devices of FIG. 1.

FIG. 2 illustrates a block diagram of a structure common to the devices 110 and MUD 120 of FIG. 1. A wireless transceiver 200 utilizes digital data to modulate a carrier signal to transmit the desired data and its receiver converts the received signals into corresponding digital data. In accordance with the present invention, transceiver 200 is a radio frequency (RF) transceiver. In the alternative, transceiver 200 may comprise any other well known wireless communication technology such as, but not limited to infrared (IR) technologies.

Transceiver 200 employs one or more antennas designated 212 for communicating with other devices 110 as shown in FIG. 1. A microprocessor 220 operates under the control of an operating system contained in read only memory 230 and utilizes random access memory 240 to control inbound and outbound data traffic carried by path 250 and transceiver 200. An interface 210 may consist of line drivers, input/output buffers and registers as is conventional in microprocessor systems. The path 250 corresponds to the connection to an external terminal device such as a personal computer, lap-top computer, notebook computer, PDA or the like. The microprocessor operation relating to power management and packet delivery is explained in more detail below.

Figure 3:
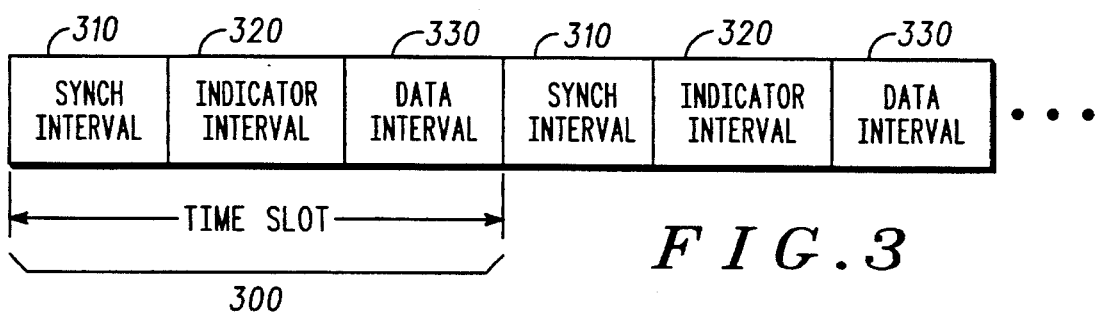
FIG. 3 depicts the structure of a transmission channel for use within the communication system of FIG. 1.

FIG. 3 depicts the structure of a transmission channel for use within the communication system of FIG. 1. In the system of FIG. 1, the information passed between devices 110 and MUD 120, is communicated during recurring Time slots 300. Each Time slot 300 typically contains a Synch interval 310 an Indicator interval 320 and a Data interval 330.

Figure 4:
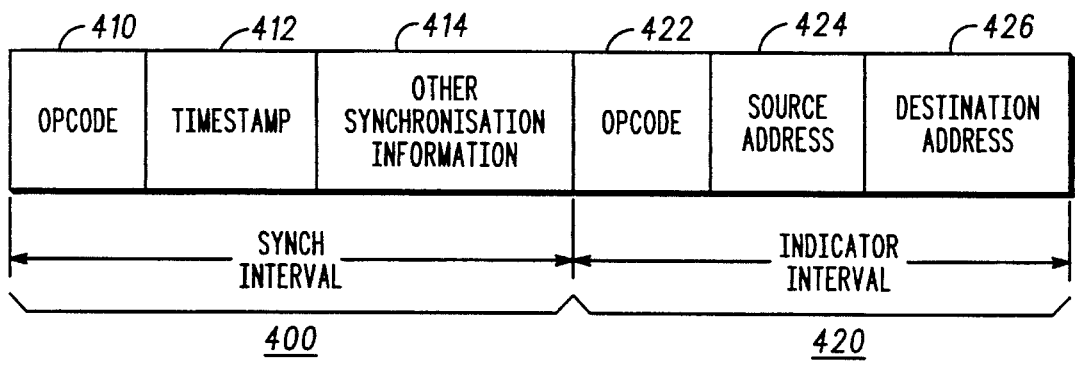
FIG. 4 is an expanded view of a portion of the transmission channel of FIG. 3.

Synch interval 310 contains a Synch Signal 400, as shown in FIG. 4, comprising synchronization information generated by MUD 120 and destined for all other devices in the MUD's zone of RF coverage. Indicator interval 320 is allocated for the transmission of Indicator signals 420, as shown in FIG. 4, and transmitted by devices 110 and MUD 120. These packets indicate or announce that a device 110 or MUD 120 desires to transmit information to a particular device within the system of FIG. 1. Data interval 330 is allocated for the transmission of data packets which are communicated to and from the plurality of devices 110 and/or MUD 120.

It will be appreciated by those skilled in the art that devices 110 and MUD 120 may utilize any of the well known channel access protocols, such as, but not limited to carrier sense multiple access (CSMA) to transmit Indicator signals 420 during Indicator interval 320 as well as data packets during Data interval 330.

Of note, each Time slot 300 is of known duration. This permits devices 110 to readily calculate the boundaries for any Time slot 300 based upon the common time reference established by Synch intervals 310 and each respective Time slot's duration. Once the Time slot boundaries are known, all devices of FIG. 1 may readily determine the boundaries of the Indicator interval 320 within a Time slot 300, for each Indicator interval 320 is of fixed and known duration.

FIG. 4 is an expanded view of the Synch interval 310 and a portion of the Indicator interval 320 of FIG. 3. Synch interval 310 maintains a Synch signal 400 as generated by MUD 120. As will be appreciated, Synch signal 400 is employed to maintain synchronization within the communication system of FIG. 1. As shown, each recurring Synch signal 400 comprises an Op code field 410, optional Time stamp 412 and Synchronization information 414. Op code field 410 contains a binary code which identifies this transmission as a Synchronization signal 400 and further operates to distinguish Synchronization signals from all other transmission channel traffic. The optional Time stamp field 412, when used, will maintain a common time reference permitting synchronization between MUD 120 and devices 110. Synchronization information 414 may include, but is not limited to the duration of Synch Interval 310, the duration of Indicator interval 320 as well as the duration of Time slot 300. As will be appreciated this information may be helpful in permitting roaming user devices to synchronize to the operation of MUD 120.

Referring back to FIG. 4, Indicator interval 320 may contain a plurality of Indicator signals 420, each comprised of an Op code field 422, source device address 424 and destination device address 426. As will be appreciated, Op code field 422 contains a binary code which identifies this transmission as a Indicator signal 420 and further operates to distinguish Indicator signals from all other transmission channel traffic. The source device address 424 identifies the source device having a data packet for transmission. The destination device address 426 identifies the destination devices for which the data packet is destined. As previously mentioned, devices 110 and 120 may utilize any of the well known channel access protocols, such as, but not limited to carrier sense multiple access (CSMA) to transmit Indicator signals 420 and data packets during Indicator interval 320 and data interval 330 respectively.

While not shown, it will be appreciated by those skilled in the art that a data packet may take the form as substantially employed by Indicator Signal 420 of FIG. 4. The primary difference being the data for transmission will typically be appended after the device destination address field. In addition the Op code field will contain a binary code which identifies this transmission as a data packet and further operates to distinguish data packets from all other transmission channel traffic.

In accordance with the present invention, it is clearly anticipated that all devices 110 and MUD 120 will be in the active mode of operation during both the Synch interval 310 and the Indicator interval 320 of each recurring Time slot 300. Devices 110 and MUD 120 may enter the sleep mode of operation, if at all, during Data interval 330 only. As will be appreciated Data interval 330 may be of significantly longer duration than Synch or Indicator intervals 310 and 320, respectively.

Figure 5:
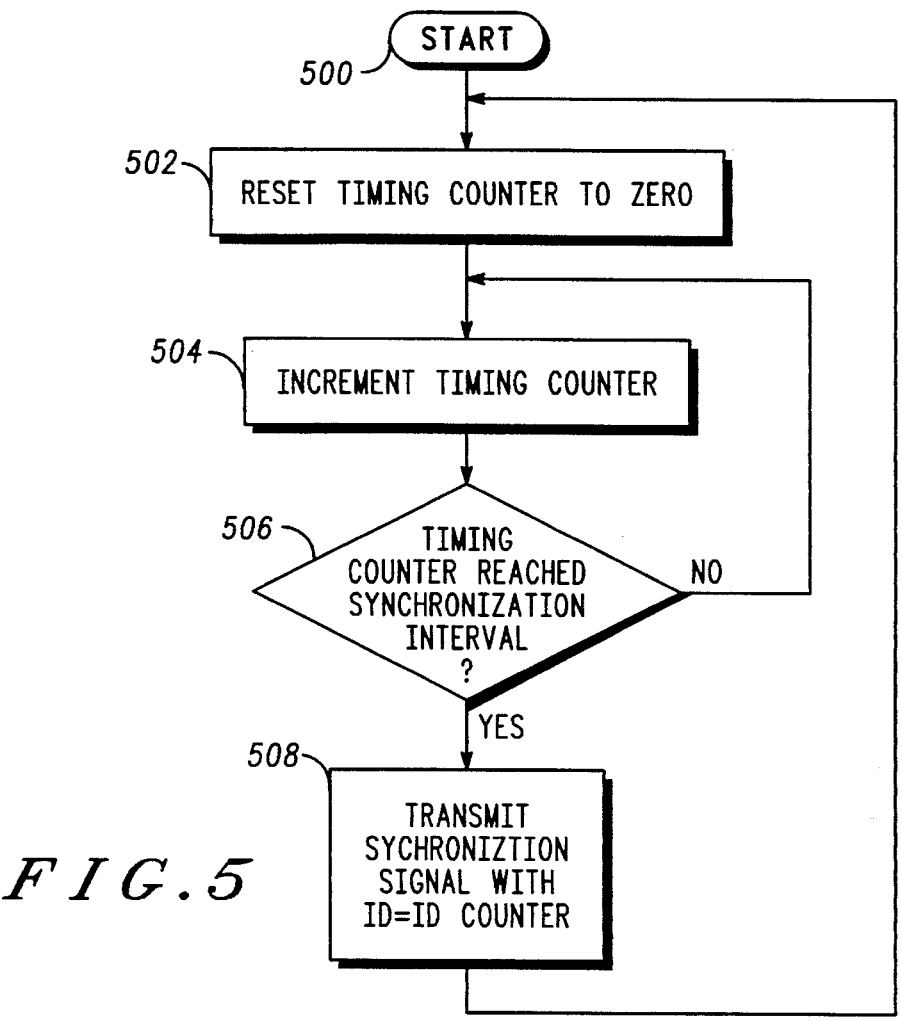
FIG. 5 is a flow chart diagram illustrating the steps performed by a master user device in order to transmit Synchronization interval information.

FIG. 5 is a flow chart diagram illustrating the steps performed by MPU 220 of MUD 120, under the direction and control of a program instruction set stored in ROM 230 of FIG. 2, in order to transmit Synch signal information to the other user devices of FIG. 1. Commencing at start block 500, flow proceeds to block 502 where a Timing Clock is set to zero. From block 502, flow proceeds to block 504 where the Timing Clock is commenced. From block 504, flow proceeds to block 506 where a check is performed to determine whether the time slot duration of a time slot 300 has been reached. If not, flow branches back to block 504 until the proper time has elapsed. From block 506, flow proceeds to block 508 where MUD 120 constructs a Synch Signal 400 as described in association with FIG. 4 and commences transmission of the constructed Synch Signal including any synchronization information associated therewith during the Synch interval 310 of a Time slot 300. From block 508, flow branches back to block 502, where the process continues.

Figure 6:
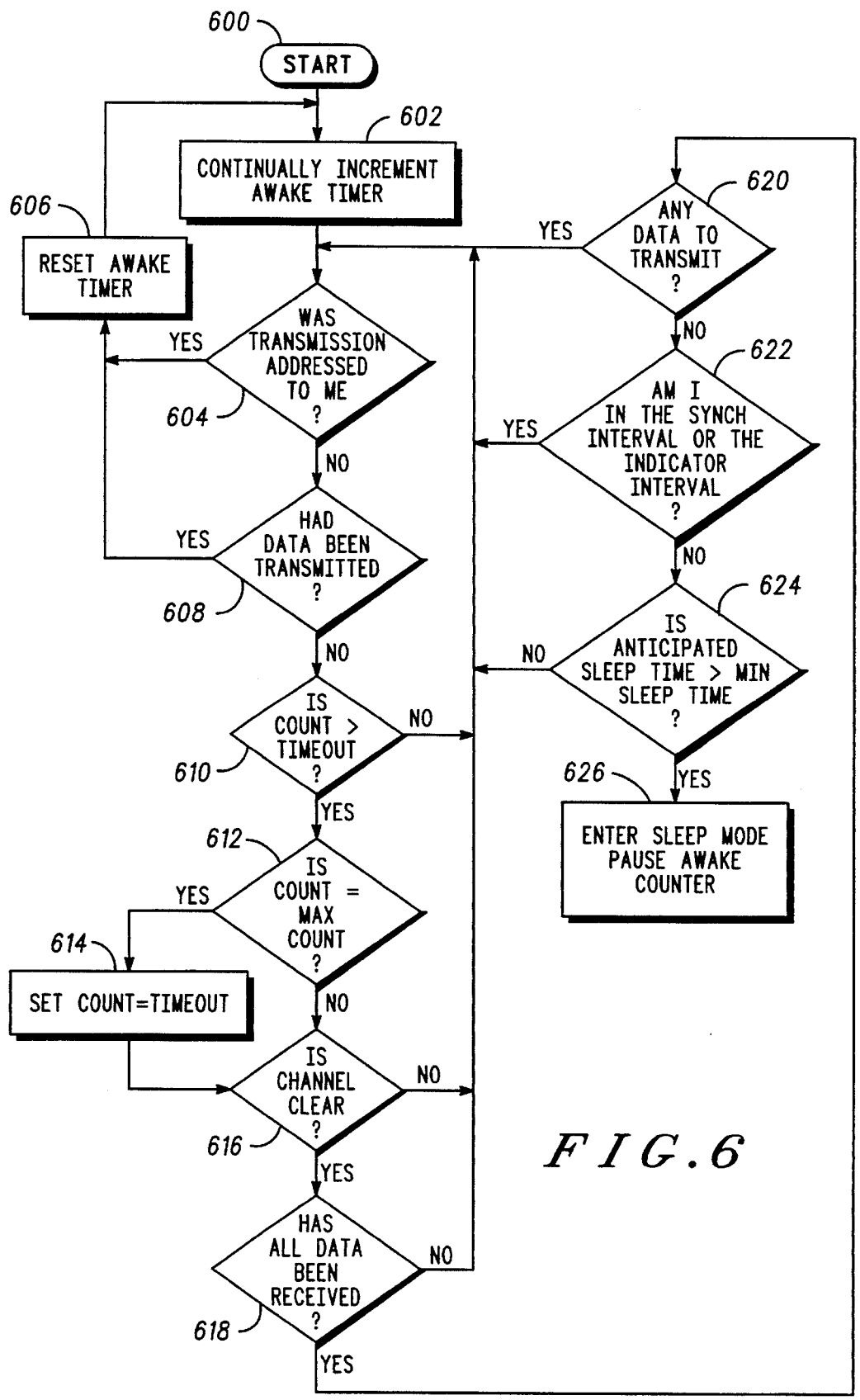
FIG. 6 is a flow chart diagram illustrating the steps performed by a user device during a transition from the active mode of operation to the sleep mode of operation.

FIG. 6 is a flow chart diagram illustrating the steps performed by MPU 220 of a device 110, under the direction and control of a program instruction set stored in ROM 230 of FIG. 2, during a transition from the active mode of operation to the sleep mode of operation. Commencing at start block 600, it is assumed that the device in question is already awake. If the device is waking for the first time, it will be necessary to initialize an awake counter which is thereafter continually incremented at block 602 while the device is in the active mode. During said active operation the device will receive transmissions in the normal course at block 604. In addition, a check is performed to determine whether the received transmission is addressed for use by the device in question. Assuming it is, flow proceeds to block 606 where the counter is set to zero and flow branches back to block 602.

If the transmission is not addressed for use by the receiving device, flow proceeds to block 608 where a check is performed to determine whether the device in question has transmitted any data since the last time the awake timer has been reset. If so, flow proceeds to block 606 where the awake counter is set to zero and flow branches back to block 602.

From the foregoing, it should be appreciated that each time a device uses the transmitter portion of transceiver 200 or receives a transmission addressed for use by the device, the awake counter is reset to zero. This has the effect of keeping the device in the active mode of operation until a specified period of transceiver inactivity has elapsed.

Assuming no transmissions and/or receptions have occurred, flow proceeds to block 610 where a check is made to determine whether the counter's count is greater than a value of time-out. In accordance with the present invention, the time-out period is set such that after a period of transceiver inactivity, if certain conditions are met, the device may then and only then transition into the sleep mode of operation. In accordance with the preferred embodiment, the time-out period is set to 20 milliseconds or the equivalence of a time slot 300 duration.

Assuming the count is less than the value of time-out, flow continually branches back to block 604 and the device remains in the active mode. If no transmissions or reception cause the counter to be reset, time-out will eventually be reached. Flow will then proceed from block 610 to block 612 where a check is performed to determine whether the counter has reached its maximum count value. If so, flow proceeds to block 614, where the count is set to the value of time-out, and flow proceeds back to block 616. This operation is performed so that the counter is not inadvertently reset to zero, thereby forcing the device to remain in the active mode, even though time-out has been satisfied.

Of course, if the maximum count has not been reached, flow proceeds to block 616 where a check is performed to determine whether the device observes a clear communication channel. This step equates to the device hearing no traffic on the channel depicted in FIG. 3. If the channel is clear, flow proceeds to block 618, else flow branches back to block 604. Thus, as long as a device monitors incoming traffic on the transmission channel of FIG. 3, it is not permitted to transition to the sleep mode.

At block 618 a check is performed to determine whether or not all data anticipated for the device in question has been received. First a check is performed to determine whether all packet fragments associated with the data received at block 604 have been received. The fragmentation of data to be transmitted over narrow bandwidth communications channels is well known in the art and will not therefore be discussed here in detail. Suffice it to say, however, that the present invention anticipates the need to perform data packet fragmentation during the delivery of data over wireless communications channels. In accordance, if all packet fragments have been received at block 618, the device may continue moving towards the sleep mode, else it must remain in the active mode until all fragmented data has been accounted for.

Next, at block 618, a check is performed to determine whether the device has received an indication that there is additional information ready for delivery to the device in question from another device. In such instances, it would be totally inappropriate to let the device lapse into the sleep mode prior to the delivery of said information. Of note, the above-mentioned indication is communicated to the device by means of Indicator signals 420 as shown and described in association with FIG. 4. If a device has received an Indicator signal 420 but has not yet received the data anticipated by or associated with that Indicator signal 420, it would be inappropriate for that device to enter the sleep mode.

To protect the user device from remaining awake unnecessarily, a predetermined indicator signal time-out counter is employed. This time-out counter employs a predetermined time-out value. This value is compared to the elapsed time since receipt of indicator signal 420. When the elapsed time exceeds the time-out value, the device may safely assume that data delivery has been aborted. This damping function prevents a user device from waiting indefinitely for data that will no longer be delivered. It will be appreciated by those skilled in the art that a similar time-out function may be employed for the transmission as well as the reception of data in the current system.

Assuming all anticipated data has been transmitted to and received by the device in question, flow proceeds from block 618 to block 620 where a check is performed to determine whether the device itself has data to transmit. If so, the device will remain in the active mode so that said data may be transmitted. If no data requires transmission, flow then proceeds to block 622, where a check is performed to determine whether the device is currently within the Synch interval 310 or Indicator interval 320 of a time slot 300. If so, it will remain in the active mode in order to monitor and decode the information therein, else flow will proceed to block 624.

At block 624, a check is performed to determine how much time will elapse before the device must necessarily wake-up (i.e., transition to the active mode), and whether this anticipated sleep period is greater than a predefined minimum sleep period. If so, the device will enter the sleep mode at block 626 and the awake counter is paused, else flow will branch back to block 604 and the device will remain in the active mode of operation. This condition is employed in order to provide a damping function which limits rapid and/or frequent device state transitions.

In order to coordinate operation (synchronization), each device 110 is required to monitor each and every Synch interval 310 and Indicator interval 320 as broadcast by MUD 120. Thus, a sleeping device must transition from the sleep mode to the active mode in time to monitor each recurring Synch signal 400. Since each Time slot 300 is of known duration, it is relatively simple to calculate when a device must next wake in order to monitor the next Synch signal 400.

Referring back to FIG. 5, after having determined the arrival time of the next Synch signal 400 and having calculated when the device must next awake, i.e., an anticipated sleep period, the anticipated sleep period is compared to a predefined minimum sleep period. If the anticipated sleep period is greater than the minimum sleep period, the device is permitted to enter the sleep mode at block 626. Otherwise the device remains in the active mode.

Figure 7:
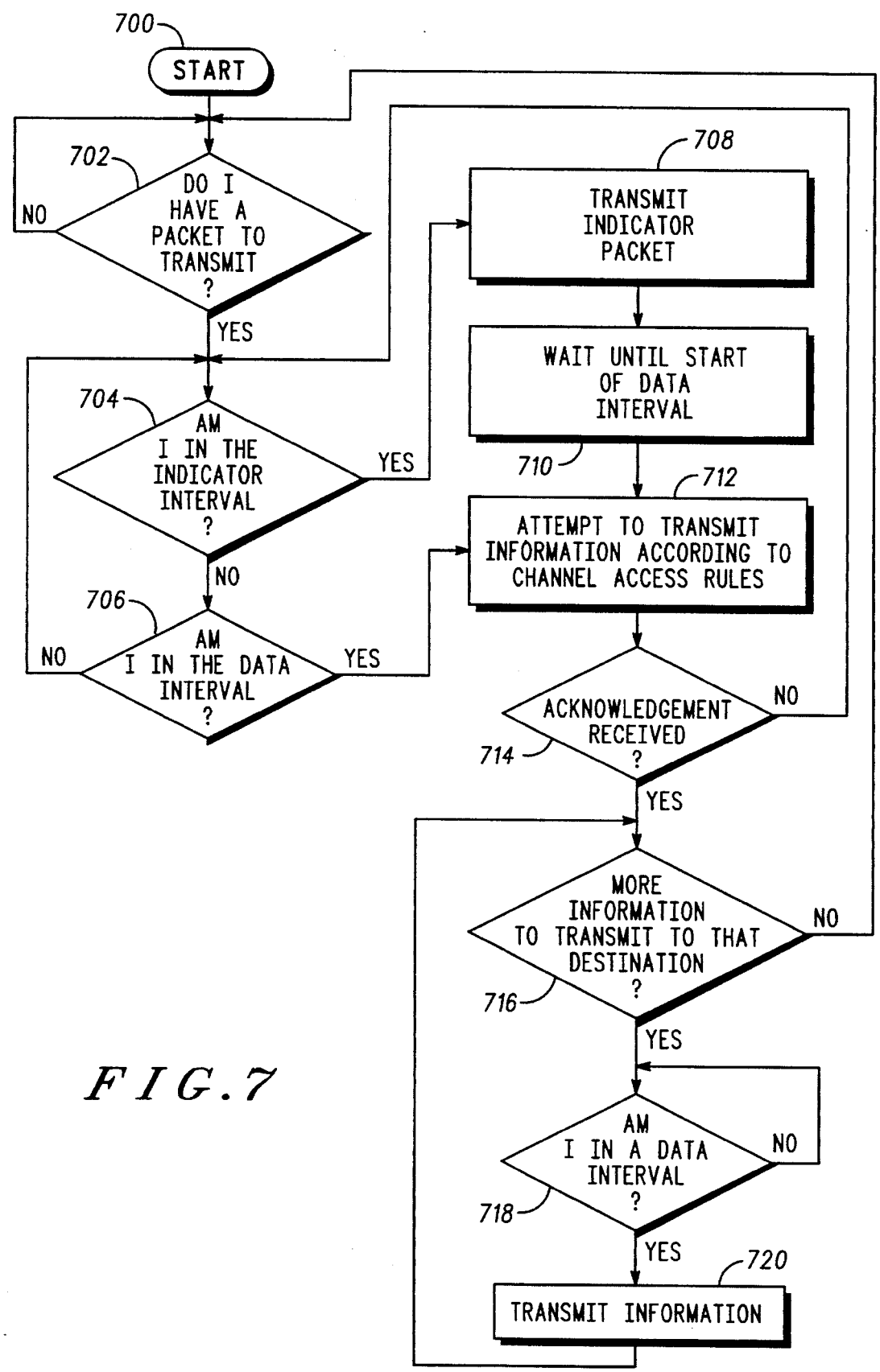
FIG. 7 is a flow chart diagram illustrating the steps performed by a user device during data transmission.

FIG. 7 is a flow chart diagram illustrating the steps performed by MPU 220 of a device 110, under the direction and control of a program instruction set stored in ROM 230 of FIG. 2, during data transmission and/or delivery. Commencing at start block 700, flow proceeds to block 702 where a check is performed to determine whether the device in question has data to transmit. If so, flow proceeds to blocks 704 and 706 where checks are performed to determine whether the device is within the Indicator interval 320 or the Data interval 330 of a current Time slot 300.

Assuming the device is within the Indicator interval 320 of the current Time slot 300, flow will proceed from block 704 to block 708 where the device will transmit an Indicator signal 400 addressed to destination device(s) 110 within the communication system of FIG. 1. From Block 708 flow then proceeds to block 710 where the transmitting device awaits the arrival of Data interval 330 within the current Time slot 300.

If the device is not within Indicator interval 320 at block 704, flow proceeds from block 704 to block 706 where a check is performed to determine whether the device is within Data interval 330 of the current Time slot 300. If not, flow branches back to block 704 where the monitoring steps of blocks 704 and 706 continue. Assuming the device is within Data interval 330 at block 706 or upon the arrival of Data interval 330 at block 710, flow proceeds to block 712, where the device 110 will transmit data in accordance with the channel access protocol employed by the communication system in question.

At block 714, the transmitting device awaits an acknowledgment (ACK) of the transmitted data. If no such ACK is received within a predetermined time period, flow branches back to block 704 where the data is retransmitted in accordance with the description of block 704–712 above.

Upon receipt of an ACK at block 714, flow proceeds to block 716 where a check is performed to determine whether the device has more data to transmit to the same destination device address. If not, flow branches back to block 702 where the process continues. Otherwise, flow proceeds to block 718 where a check is performed to determine whether the transmitting device is within the Data interval 330 of the current Time slot 300. If not, flow branches back until arrival of Data interval 330. Upon its arrival, flow proceeds to block 720 where the data will be transmitted. From block 720 flow branches back to block 716 where processing continues until no more data is available for transmission to that particular destination device address. Thereafter, flow will branch from block 716 to block 702 where the above described process repeats.

A noteworthy aspect of the strategy of the present invention is that when a user device generates a packet for transmission at an instant in time that is outside of the Indicator interval 320 (e.g., during Data interval 330), the device will attempt to transmit the desired data without waiting for the next Indicator interval 320. After data transmission, if an acknowledgment is received from the destination device, the source device may assume the destination device is currently in the active mode of operation. If, on the other hand, no acknowledgment is received from the destination device, the source device will assume the destination device is in the sleep mode of operation, and in response thereto will wait until the next Indicator interval 320 to transmit an Indicator signal 420 to notify the destination device that packets are awaiting transmission to that device. This process has the advantage of removing both the responsibility and the necessity of each device 110 or MUD 120 to continually track the awake or sleep status of the other devices within the zone of RF coverage offered by MUD 120.

Figure 8:
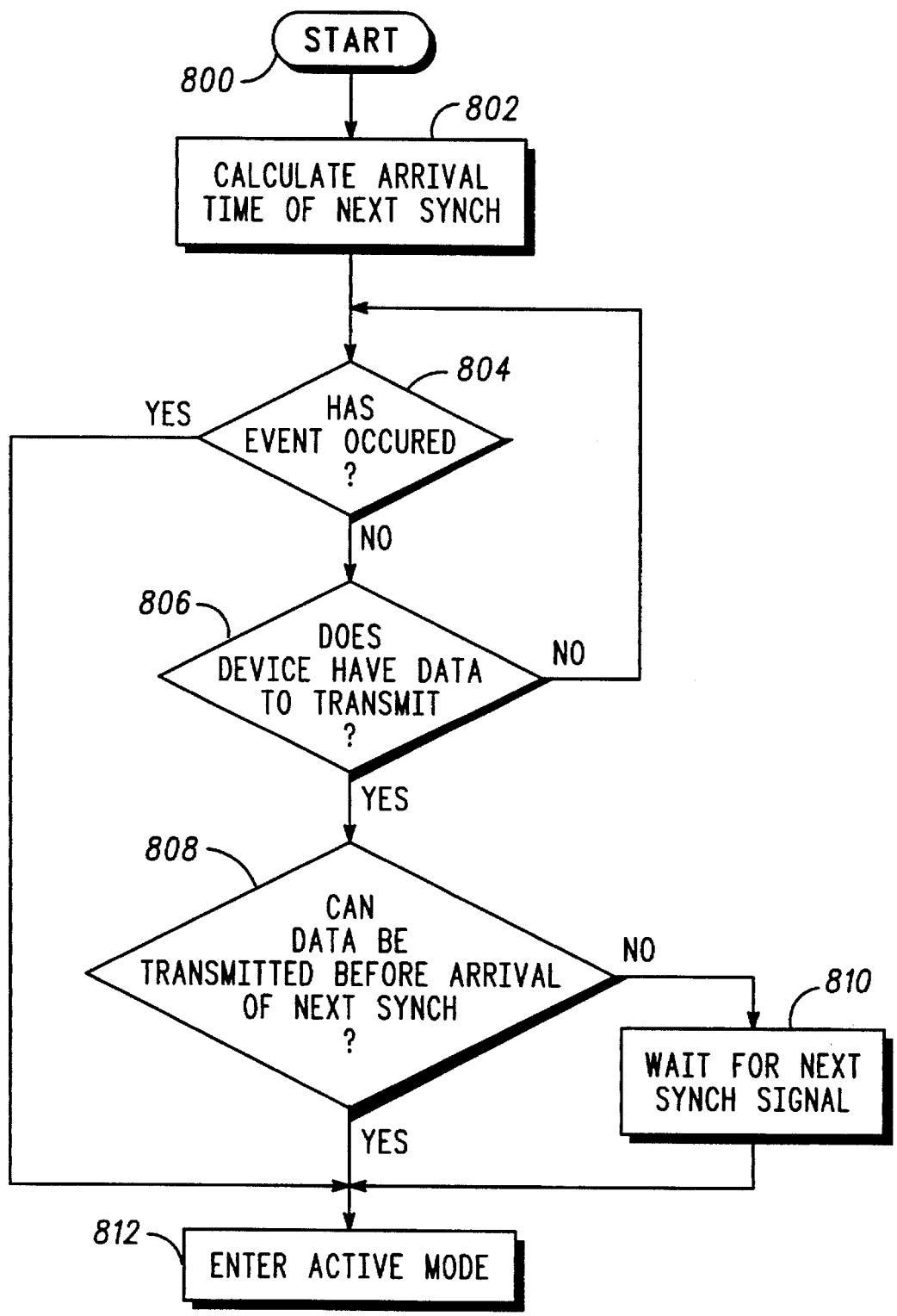
FIG. 8 is a flow chart diagram illustrating the steps performed by a user device or MUD in order to transition from the sleep mode of operation to the active mode of operation.

FIG. 8 is a flow chart diagram illustrating the steps performed by MPU 220 of user device 110 or MUD 120, while under the direction and control of a program instruction set stored in ROM 230 of FIG. 2, in order for the user device 110 or MUD 120 to transition from the sleep mode of operation to the active mode of operation. Commencing at start block 800 it is assumed that the device is in the sleep mode of operation. Flow proceeds to block 802 where the asleep device calculates an arrival time for a next Synch interval 310. As previously stated, each Time slot 300 is of known duration, thereby permitting devices 110 to readily calculate the boundaries for any Time slot 300 based upon the common time reference established by Synch intervals 310 and each respective Time slot's duration.

Proceeding to block 804 a check is performed to determine whether the calculated start time has arrived. Assuming it has, flow branches ahead to block 812 where the user device transitions from the sleep mode to the active mode of operation in order to monitor the arriving Synch signal 310. If not, then, flow proceeds from block 804 to block 806 where a check is performed to determine whether the device has information that it desires to transmit. If not, flow branches back to block 804 where the process awaits the arrival of a next Synch signal 310. If, on the other hand, the device has data to transmit, flow proceeds to block 808, where a check is performed to determine whether the transmission can be completed before the arrival of the next Synch Signal 310. If so, flow proceeds to block 812 where the device in the sleep mode, transitions to the active mode of operation in order to transmit the information. If, on the other hand, there is not enough time for the device to complete the transmission prior to the arrival of the next Synch Signal 310, flow proceeds to block 810 where the device awaits the arrival of the next Synch Signal 310 prior to advancing to block 812.

The purpose of these steps is to assure that no user devices 110 attempt to transmit data during a time when MUD 120 is transmitting Synch Signals thereby avoiding the possibility of radio interference and the corruption of the synchronization information within a Synch Signal 310.

What is claimed is:

1. A power management and packet delivery method for use in a wireless local area network (LAN) having a plurality of mobile battery powered user devices, said user devices in communication with each other, said power management and packet delivery method comprising the steps of:

establishing a plurality of recurring time intervals, each time interval having a first portion during which all user devices are in the active mode of operation and a second portion for communication of packet data using data packet fragmentation;

transmitting an indicator signal from a user device having data to transmit during a first portion of at least one of a plurality of recurring time intervals prior to transmission of said data;

receiving said transmitted indicator signal at an intended destination device;

determining whether the signal was addressed for use;

remaining in an active mode of operation when the indicator signal is addressed for use and receiving a fragment of a packet of data;

when the indicator signal is not addressed for use, determining whether all packet fragments anticipated for the destination device have been received;

remaining in the active mode of operation when not all packet fragments anticipated for the destination device have been received;

else entering the sleep mode of operation when sleep mode conditions are satisfied.

2. The method of claim 1 further comprising the step of determining whether sleep mode conditions are satisfied by:

identifying a clear communications channel; and determining whether any information, stored at the user device, is ready for transmission from the user device.

3. The method of claim 2 wherein the step of determining whether sleep conditions are satisfied further comprises the steps of:
establishing an indicator signal time-out value;
determining a period of time that has elapsed since receipt of the indicator signal; and
comparing the elapsed time period to the time-out value;

and wherein the step of entering the sleep mode comprises entering the sleep mode when the elapsed time period is greater than the indicator signal time-out value.

4. A power management and packet delivery method for use in a wireless local area network (LAN) having a plurality of mobile battery powered user devices, said user devices in communication with each other, said power management and packet delivery method comprising the steps of:

establishing a plurality of recurring time intervals, each time interval having a portion during which all user devices are in the active mode of operation;

transmitting an indicator signal from a user device having data to transmit during at least one of the plurality of recurring time intervals and prior to transmission of said data;

receiving said transmitted indicator signal at an intended destination device;

determining whether the signal was addressed for use;

remaining in an active mode of operation when the indicator signal is addressed for use;

else, determining whether sleep mode conditions are satisfied;

establishing a minimum sleep period;

estimating an anticipated sleep period;

comparing the minimum sleep period of the anticipated sleep period; and entering a sleep mode of operation when sleep mode conditions are satisfied and when the anticipated sleep period exceeds the minimum sleep period.

5. The method of claim 1 further comprising the step of:

initializing an awake counter, said counter having a maximum count value;

determining a counter time-out value;

incrementing the counter during the user device's active mode of operation; and prohibiting the user device from entering the sleep mode when the awake counter value is less than the value of time-out.

6. The method of claim 5 further comprising the step of resetting the awake counter whenever the user device transmits information.

7. The method of claim 5 further comprising the steps of:

resetting the awake counter whenever the user device receives a packet addressed for the user device in question; and refraining from resetting the awake counter when the user device receives a packet addressed for delivery to any other device in the network.

8. The method of claim 5 further comprising the step of:

resetting the awake counter to the time-out value upon the counter incrementing to the maximum count value.

9. The method of claim 5 further comprising the step of inhibiting the awake counter while the user device is in the sleep mode.

10. The method of claim 1 further comprising the steps of a user device transitioning from the sleep mode of operation to the active mode of operation whenever the user device has data for transmission.

11. A power management and packet delivery method for use in a wireless local area network (LAN) having a plurality of mobile battery powered user devices, said user devices in communication with each other, said power management and packet delivery method comprising the steps of:

establishing a plurality of recurring time intervals, each time interval having a portion during which all user devices are in the active mode of operation;

transmitting an indicator signal from a user device having data to transmit during at least one of the plurality of recurring time intervals and prior to transmission of said data;

receiving said transmitted indicator signal at an intended destination device;

determining whether the signal was addressed for use;

remaining in an active mode of operation when the indicator signal is addressed for use;

else, entering a sleep mode of operation when sleep mode conditions are satisfied;

calculating an arrival time for a next synchronization signal;

establishing a minimum transmit time for transmission of data to be transmitted by the user device;

comparing the calculated arrival time to the minimum transmit time;

transitioning from the sleep mode of operation to the active mode of operation when the arrival time is greater than the minimum transmit time; else transitioning from the sleep mode of operation to the active mode of operation at the arrival time of the next synchronization signal.

12. A power management and packet delivery method for use in a wireless local area network (LAN) having a plurality of mobile battery powered user devices, including a first user device and a plurality of second user devices, said user devices in communication with each other, said power management and packet delivery method comprising the steps of:

establishing a plurality of recurring time intervals, each time interval having a first portion during which all user devices are in the active mode of operation and a second portion during which user devices may operate in a sleep mode of operation;

prior to data transmission, said first user device determining whether it is in the first or the second portion of a current time interval;

when in the first portion of the current time interval, said first user device, transmitting an indicator signal to the plurality of second user devices;

said plurality of second user devices receiving said transmitted indicator signal;

each user device within said plurality of second user devices determining whether the signal was addressed for use and remaining in an active mode of operation when the indicator signal is addressed for use, else, entering a sleep mode of operation when sleep mode conditions are satisfied; and said first user device transmitting the data when in the second portion of the current time interval, irrespective of any transmission by the first user device in any preceding first portion of the current time interval.

13. The method of claim 12 further comprising the steps of:

awaiting an acknowledgement that the transmitted data was received by a destination device;

determining that the destination device is in the active mode upon receipt of said acknowledgement; and determining that the destination device is in the sleep mode of operation when an acknowledgement is not received within a predetermined period of time.

14. The method of claim 13 further comprising the steps of:

waiting for the arrival of the first portion of a next recurring time interval; and transmitting an indicator signal to the plurality of user devices.

15. A power management and packet delivery method for use in a wireless local area network (LAN) having a plurality of mobile battery powered user devices, including a first user device and a plurality of second user devices, said user devices in communication with each other, said power management and packet delivery method comprising the steps of:

establishing a plurality of recurring time intervals, each time interval having a first portion during which all user devices are in the active mode of operation and a second portion during which user devices may operate in a sleep mode of operation;

prior to data transmission, said first user device determining whether it is in the first or the second portion of a current time interval;

when in the first portion of the current time interval;

said first user device transmitting an indicator signal to the plurality of second user devices;

said plurality of second user devices receiving said transmitted indicator signal; and each user device within said plurality of second user devices determining whether the signal was addressed for use and remaining in an active mode of operation when the indicator signal is addressed for use, else, entering a sleep mode of operation when sleep mode conditions are satisfied; but when in the second portion of the current time interval said first user device;

transmitting the data irrespective of any transmission by the first user device in any preceding first portion of the current time interval;

awaiting an acknowledgement that the transmitted data was received by a destination device of the plurality of second user devices;

when an acknowledgement is not received within a predetermined period of time, waiting for the arrival of the first portion of a next recurring time interval;

transmitting an indicator signal during the first portion of said next recurring time interval; and transmitting the data during the second portion of said next recurring time interval.

\* \* \* \* \*